(12) United States Patent
Chen et al.

(10) Patent No.: US 11,757,370 B2
(45) Date of Patent: Sep. 12, 2023

(54) ENERGY STORAGE MMC TOPOLOGY AVOIDING MICROCIRCULATION OF BATTERY AND METHOD FOR CONTROLLING THE SAME

(71) Applicant: Zhejiang University, Zhejiang (CN)

(72) Inventors: Min Chen, Zhejiang (CN); Guannan Zhu, Zhejiang (CN); Song Tang, Zhejiang (CN); Chenghao Zhang, Zhejiang (CN); Zhaopei Liang, Zhejiang (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 17/740,391

(22) Filed: May 10, 2022

(65) Prior Publication Data
US 2023/0246566 A1 Aug. 3, 2023

(30) Foreign Application Priority Data
Jan. 30, 2022 (CN) .......................... 202210115626.1

(51) Int. Cl.
*H02M 7/483* (2007.01)
*H02J 3/36* (2006.01)

(52) U.S. Cl.
CPC ............. *H02M 7/4835* (2021.05); *H02J 3/36* (2013.01)

(58) Field of Classification Search
CPC ................................ H02M 7/4835; H02J 3/36
See application file for complete search history.

(56) References Cited

U.S. PATENT DOCUMENTS

| 10,116,159 | B1* | 10/2018 | Li | H02J 7/0068 |
| 10,790,738 | B1* | 9/2020 | Mhiesan | H02M 7/49 |
| 2014/0049230 | A1* | 2/2014 | Weyh | H02M 7/49 |
| | | | | 323/207 |
| 2014/0369094 | A1* | 12/2014 | Hosini | H02M 1/32 |
| | | | | 363/50 |
| 2017/0214310 | A1* | 7/2017 | Zhang | H02M 7/487 |
| 2018/0026519 | A1* | 1/2018 | Tengner | H02M 7/49 |
| | | | | 320/137 |
| 2020/0052611 | A1* | 2/2020 | Zhang | H02M 7/5155 |

FOREIGN PATENT DOCUMENTS

| EP | 2852040 A1 * | 3/2015 | H02M 1/32 |
| WO | WO-2017182091 A1 * | 10/2017 | H02M 7/483 |
| WO | WO-2019007475 A1 * | 1/2019 | H02M 1/34 |

* cited by examiner

*Primary Examiner* — Fred E Finch, III

(57) ABSTRACT

An energy storage MMC topology is proposed to avoid the microcirculation of battery. The topology consists of six bridge arms in three stages and can be connected to DC system and AC system. Each bridge arm is composed of one bridge arm inductance and N energy storage sub-modules with the same structure in series. The energy storage sub-modules include a half-bridge power module, a battery energy storage module and a group of anti-parallel thyristors. The group of anti-parallel thyristors is connected in series over the DC cable between the battery energy storage module and a capacitor of the half-bridge power module. The switching control is performed on the battery in the energy storage MMC according to the systematic operating mode.

4 Claims, 6 Drawing Sheets

Battery energy storage module    Half-bridge power module

ENERGY STORAGE MMC TOPOLOGY AVOIDING MICROCIRCULATION OF BATTERY AND METHOD FOR CONTROLLING THE SAME

CROSS REFERENCE TO RELATED APPLICATIONS

The present application claims the benefit of Chinese Patent Application No. 202210115626.1 filed on Jan. 30, 2022, the contents of which are incorporated herein by reference in their entirety.

FIELD OF THE INVENTION

The present disclosure relates to the technical field of multilevel power electronic converters, and more particularly, to a topology of a battery energy storage modular multilevel converter and a method for controlling the same.

BACKGROUND OF THE INVENTION

Battery energy storage is an important technical means for ensuring a high proportion of new energy consumption and improving the security, stability and flexibility of the power grid. However, compared with energy storage technologies such as mechanical energy storage, pumped storage, etc. the battery energy storage has the problems of a short service cycle, a whole high life cycle cost, a high security risk, etc.

An energy storage converter is a key unit for realizing the power exchange between a battery and the power grid in the energy storage system. Current energy storage systems often adopt a scheme of connecting multiple low-voltage converters in parallel to centralize voltage boost, which has problems such as a small capacity of a single unit, connecting a large number of batteries in series and parallel, etc. The energy storage converter based on a Modular Multilevel Converter (MMC), due to its advantageous structure, can realize the direct connection of the batteries to the high-voltage power grid without a transformer, and thus can effectively reduce losses of the system. At the same time, the batteries can be divided and managed to ensure the flexibility and reliability of the system. Therefore, the energy storage converter based on MMC has a great application prospect in the future large-scale energy storage system.

In the energy storage MMC, since there exists larger ripple current in the DC port of each sub-module, if no additional measures are taken, a large amount of the ripple current will flow directly into the battery. If the ripple current has a zero-crossing point, the battery will be caused to be charged (discharged) additionally, thereby resulting in unnecessary microcirculation. The charging and discharging times of the battery are limited, and the cycle life of the battery is an important indicator for measuring the service life of the battery. The formation of the microcirculation will directly cause the life loss of the battery energy storage system.

At present, there is no research specially on the microcirculation problem of the battery of the energy storage MMC. Most of the related researches on reducing losses of the battery and prolonging the life of the battery are aimed at suppressing the ripple current of the battery. Connection of the sub-module to the battery via a passive filter can filter out the low-frequency harmonic current, and can solve the microcirculation problem of the battery to a certain extent, but a larger inductance capacitor is required with a high cost and a large volume. Connection of the sub-module to the battery via a DC-DC converter can prevent the ripple current from directly flowing into the battery, but such an approach will only suppress the magnitude of the current fluctuation component to a certain extent, but cannot completely solve the microcirculation problem of the battery. In addition, connection to the battery via a DC-DC converter will significantly increase the number of the required devices. Furthermore, in order to achieve a better effect, larger passive elements are often required. As a result, the cost and control complexity of this method is much higher than directly connecting the sub-module to the battery, which is not conducive to the large-scale application of the energy storage MMC.

Therefore, in order to ensure the long service life of the battery in the energy storage MMC and reduce the whole life cycle cost of the energy storage system, the disclosure designs an energy storage MMC topology avoiding microcirculation of a battery and a method for controlling the same.

SUMMARY OF THE INVENTION

One problem to be solved by the disclosure is to overcome the deficiencies of the prior art and thus provide an energy storage MMC topology avoiding microcirculation of a battery and a method for controlling the same.

In order to solve the above problem, the disclosure proposes the following solutions for implementation.

Provided is an energy storage MMC topology avoiding microcirculation of a battery. The topology is composed of six bridge arms in three phases. Each of the phases includes two bridge arms, namely, an upper bridge arm and a lower bridge arm. A common point of the bridge arms in three phases is configured as a DC port. A midpoint between the upper and lower bridge arms is configured as an AC port. The DC port and the AC port are configured to be connected to a DC system and an AC system respectively.

Each of the bridge arms is composed of one bridge arm inductance and N energy storage sub-modules with the same structure in series, with N≥2. The energy storage sub-modules each include a half-bridge power module, a battery energy storage module, and an interface unit therebetween. The interface unit includes a group of anti-parallel thyristors. The group of anti-parallel thyristors are connected in series over a DC cable between the battery energy storage module and a capacitor of the half-bridge power module.

As a preferred embodiment of the disclosure, the half-bridge power module is composed of two switching power devices with a reverse diode and one capacitor.

As a preferred embodiment of the disclosure, in the anti-parallel thyristors, an anode of a first thyristor $T_1$ is connected to a positive electrode of the battery energy storage module, and a cathode of a second thyristor $T_2$ is connected to the positive electrode of the battery energy storage module.

The disclosure further provides a method for controlling the above energy storage MMC topology avoiding microcirculation of a battery. When the energy storage MMC operates normally, a systematic current operating mode is firstly judged according to operating parameters, and then switching control is performed on the battery energy storage module. The following detailed steps are included.

1) If the AC side power is equal to the DC side power in the energy storage MMC, power of the energy storage battery is set as $P_{bat}=0$, where it is determined that the energy storage MMC shall operate in a battery bypass mode, and trigger signals $S_{p(n)\_x1}$ and $S_{p(n)\_x2}$ of two anti-parallel thyristors in the interface unit are both set to 0, so that the battery energy storage module is bypassed.

2) If the AC side power is not equal to the DC side power in the energy storage MMC, an operating flag value flag is calculated according to the following formula (2):

$$\text{flag} = |P_{dc}| - \frac{U_{dc}}{U_m}|P_{ac}| \quad (2)$$

where $P_{dc}$ is the power of the systematic DC side, $U_{dc}$ being the DC bus voltage, $U_m$ being the AC bus voltage amplitude, and $P_{ac}$ being the power of the systematic AC side.

3) If the flag>0, it is determined that the battery of the energy storage MMC shall be in a full cycle switch-in mode, where the trigger signals $S_{p(n)\_x1}$ and $S_{p(n)\_x2}$ of the anti-parallel thyristors are both set to 1.

4) If the flag≤0, it is determined that the battery of the energy storage MMC shall be in a partial switch-in mode, where the trigger signals of the anti-parallel thyristors are judged and set according to the following substeps.

4.1) Power demand of the energy storage battery is calculated according to the following formula (1):

$$P_{bat} = P_{ac} - P_{dc} \quad (1)$$

where $P_{bat}$ is the power of the energy storage battery, $P_{ac}$ being the power of the systematic AC side, and $P_{dc}$ being the power of the systematic DC side.

4.2) If the $P_{bat}$<0, it is determined that the battery is in a charging state, in which the discharge current shall be prevented from flowing into the battery during charging. In this state, the trigger signal $S_{p(n)\_x1}$ of the first thyristor $T_1$ is set as 0, and the trigger signal of the second thyristor $T_2$ is determined depending on bridge arm current at present, where if $i_{p(n)x}$>0, $S_{p(n)\_x2}$=1, and if $i_{p(n)x}$≤0, $S_{p(n)\_x2}$=0.

4.3) If the $P_{bat}$>0, it is determined that the battery is in a discharge state, in which charging current shall be prevented from flowing into the battery during discharge. In this state, the trigger signal $S_{p(n)\_x2}$ of the second thyristor $T_2$ is set as 0, and the trigger signal of the first thyristor $T_1$ is determined depending on the bridge arm current at present, where if $i_{p(n)x}$<0, $S_{p(n)\_x2}$=1, and if $i_{p(n)x}$≥0, $S_{p(n)\_x2}$1=0.

As a preferred embodiment of the disclosure, when the energy storage MMC is initiated, the trigger signals $S_{p(n)\_x1}$ and $S_{p(n)\_x2}$ of the anti-parallel thyristors are both maintained at 1 until the energy storage MMC operates stably.

As a preferred embodiment of the disclosure, the method further includes decoupling control of the AC/DC power to ensure stable exchange of the power at three ports, namely, the systematic AC side, the systematic DC side and the battery energy storage module. The control of the AC side power adopts a conventional double closed loop structure, which can realize decoupling d-axis current and q-axis current in a synchronous rotating coordinate system, and controlling active power and reactive power respectively. The control of the powder of the DC side adopts a phase-separated independent control method, in which an outer loop is a DC power loop, and an inner loop is a circulating current suppression loop. The DC power loop is subjected to proportional integral control to output a DC current tracking value of each bridge arm. The circulation suppression loop is subjected to quasi-proportional resonance integral control to realize second circulating current suppression and third harmonic suppression.

Compared with the prior art, the disclosure will exhibit the following effects.

1. The disclosure provides an energy storage MMC topology avoiding microcirculation of a battery and a method for controlling the same. The operating mode of the system is judged according to the system operating parameters, and then the batteries are switched as needed, thereby avoiding the microcirculation problem of the battery, reducing the life loss of the battery and reducing the whole life cycle cost of the system 2. The disclosure can significantly reduce peaks of the current of the battery, reduce losses of the battery, and further prolong the service life of the battery.

3. The control method proposed by the disclosure can ensure the stable exchange of the power at three ports, namely the AC side, the DC side and the battery, and can also suppress second circulating current of the bridge arm and the third harmonic of the system, and ensuring the safe and stable operation of the system.

4. Compared with the prior art, the topology proposed by the disclosure has the advantages of simple implementation, a low cost and high reliability.

DETAILED DESCRIPTION OF THE EMBODIMENTS

The solutions in the embodiments of the disclosure will be clearly and completely described below with reference to the accompanying drawings in the embodiments of the disclosure. It shall be understood that the described embodiments are only intended to illustrate the disclosure rather than to limit the scope of the disclosure, and any modifications and equivalents made under the inspiration of the disclosure, or products similar to the disclosure obtained by combining the disclosed features with other technical features may fall within the scope of the disclosure.

Figure 1:
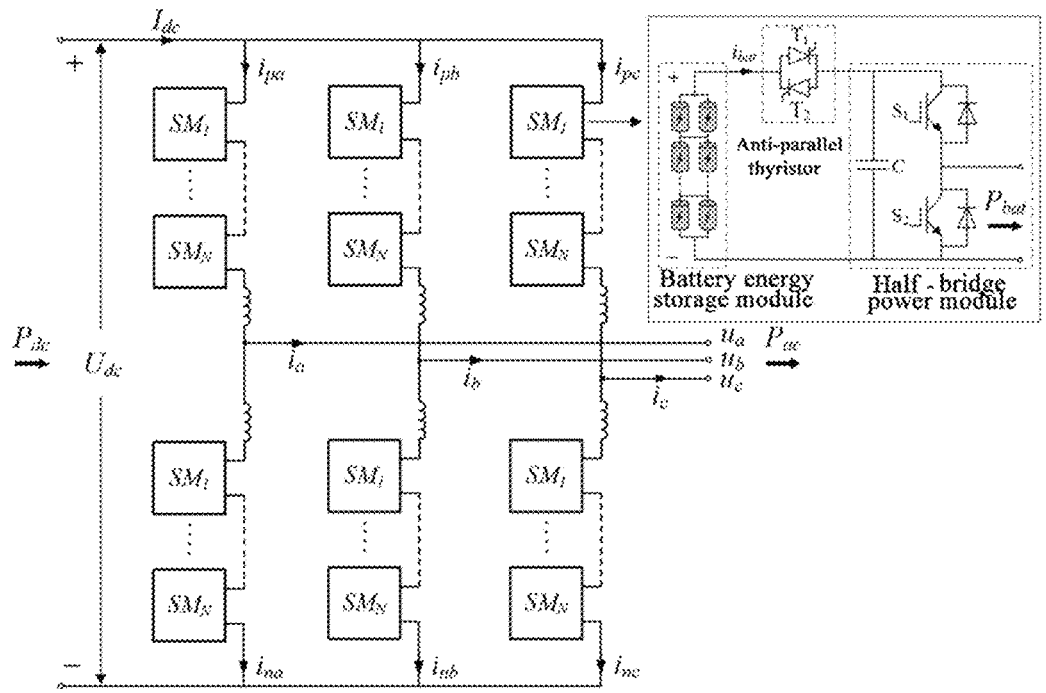
FIG. 1 illustrates an energy storage MMC topology avoiding microcirculation of a battery according to an embodiment of the disclosure.

The energy storage MMC topology proposed by the disclosure, as shown in FIG. 1, includes six bridge arms in three phases. Each of the phases includes two bridge arms, namely an upper bridge arm and a lower bridge arm (i.e., upper bridge arm p and lower bridge arm n). Each of the bridge arms is composed of one bridge arm inductance L and N energy storage sub-modules (SM) with the same structure in series, with N≥2. The energy storage MMC topology is simultaneously provided with a DC port and an AC port. A common point of the bridge arms in three phases is configured as a DC port. A midpoint between the upper and lower bridge arms is configured as an AC port. The DC port and the AC port can be directly connected to DC and AC systems respectively. The energy storage sub-modules each include a half-bridge power module, a battery energy storage module and an interface unit therebetween. The interface unit includes a group of anti-parallel thyristors. The group of anti-parallel thyristors are connected in series over a DC cable between the battery energy storage module and a capacitor of the half-bridge power module.

The power of the DC side of the energy storage MMC is indicated as $P_{dc}$. The power of the AC side is indicated as $P_{ac}$. The DC bus voltage is indicated as $U_{dc}$. The DC current is indicated as $I_{dc}$. The three-phase AC bus voltage is indicated as $u_x$ (x=a, b and c). The three-phase AC current is indicated as $i_x$. The bridge arm current is indicated as $i_{p(n)x}$. The sub-module battery current is indicated as $i_{bat}$. The direction of each parameter identified in FIG. 1 is taken as a positive direction herein, and they will not be explained repeatedly below.

Figure 2:
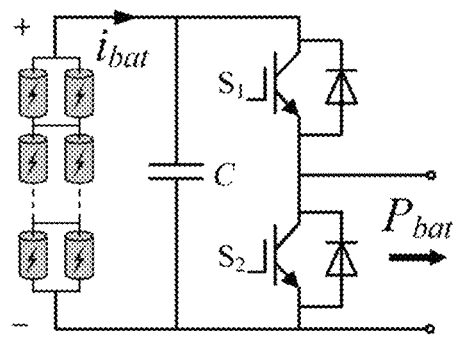
FIG. 2 illustrates a topology for a conventional energy storage MMC sub-module.
Figure 3:
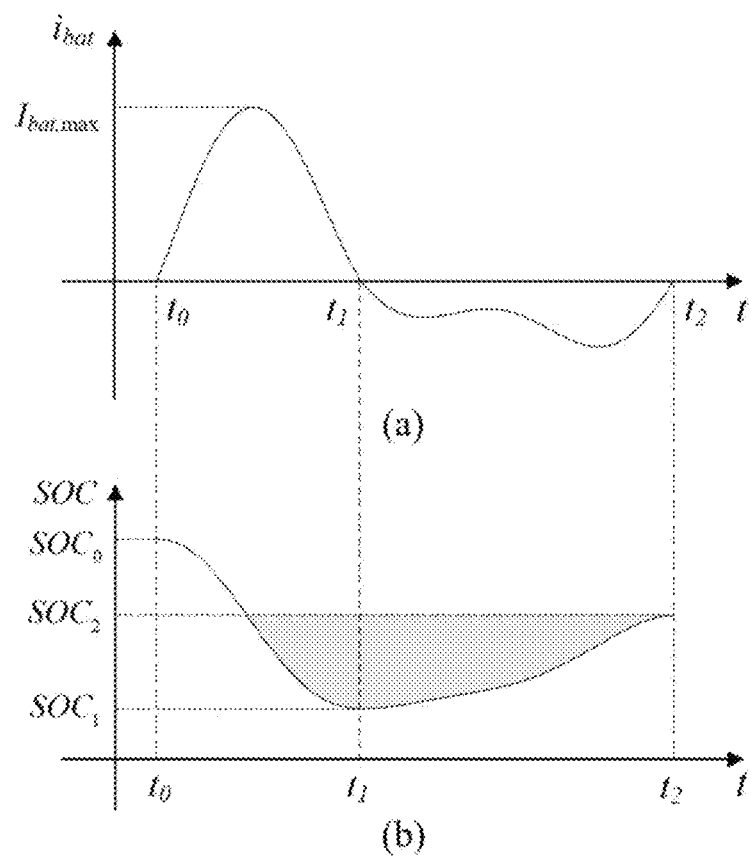
FIG. 3 illustrates a schematic diagram of waveforms of (a) battery current and (b) battery SOC of the conventional energy storage MMC sub-module.

In order to facilitate understanding of the problem to be solved by the disclosure, the "microcirculation" will be further described here. FIG. 2 shows a topology for a conventional energy storage MMC sub-module, which adopts a half-bridge structure and is composed of two insulated gate bipolar transistors (IGBTs) and one capacitor, and in which a battery cluster is directly connected across the capacitor in parallel. FIG. 3 depicts a schematic diagram of a waveform of battery current $i_{bat}$ and a waveform of State of Charge (SOC) of the battery of the sub-module of the conventional energy storage MMC within a power frequency cycle under an operating condition that DC power $P_{dc}$=0.8 pu and AC power $P_{ac}$=1.0 pu. For a clear visual representation, a high-frequency component caused by switching and a lesser low-frequency harmonic component are ignored in the waveform diagram. As shown in FIG. 3, when the conventional energy storage MMC operates normally, the sub-module battery current $i_{bat}$ includes a DC component, a fundamental frequency component and a double frequency component. According to the three-port power relationship of the energy storage MMC, as expressed in formula (1), it can be known that an average power of the battery is 0.2 pu ($Pb_{at}$=0.2 pu) at this time, and the battery shall be in a discharge state.

$$P_{bat}=P_{ac}-P_{dc} \quad (1)$$

In the formula (1), $P_{bat}$ is the power of the energy storage battery, P being the power of the systematic AC side, and $P_{dc}$ being the power of the systematic DC side.

The state of the battery within the power frequency cycle will be further analyzed according to FIG. 3. In a time period from $t_0$ to $t_1$, the direction of $i_{bat}$ is positive, which indicates discharge current having a peak value of $I_{bat,max}$, and the State of Charge (SOC) of the battery drops from an initial $SOC_0$ to a minimum value $SOC_1$ within the power frequency cycle. In the time period from $t_1$ to $t_2$, the direction of $i_{bat}$ is negative, which indicates charging current, and the State of Charge of the battery rises from the minimum value $SOC_1$ within the power frequency cycle to a final value $SOC_2$ at the end of the cycle. For the battery, the ideal state is that within the time period from $t_0$ to $t_2$, there is only discharge current in $i_{bat}$, and from the initial State of Charge $SOC_0$ to the final value $SOC_2$, there shall be no stage where the State of Charge is lower than $SOC_2$, that is, no charging process.

However, due to the half-bridge structure of the conventional energy storage MMC sub-module, the current direction of the sub-module only depends on the current direction of the bridge arm when the sub-module is switched on. The battery is switched with the sub-module, leading to battery charging current in $i_{bat}$. Thus, the battery undergoes additional microcirculation (as shown in a shaded area in FIG. 3(b)). On one hand, when the energy storage system operates for a long time, the occurrence of microcirculation will directly cause a reduced cycle life of the battery. On the other hand, in order to ensure constant output power of the battery, the occurrence of microcirculation will cause an increased peak value $I_{bat,max}$ of the discharge current, thereby increasing losses of the battery.

It should be noted that this description only takes a single operating condition of the energy storage MMC as an example, and the "microcirculation" problem generally exists on other operating conditions of the energy storage MMC.

The disclosure proposes an energy storage MMC topology avoiding microcirculation of a battery and a method for controlling the same.

Figure 4:
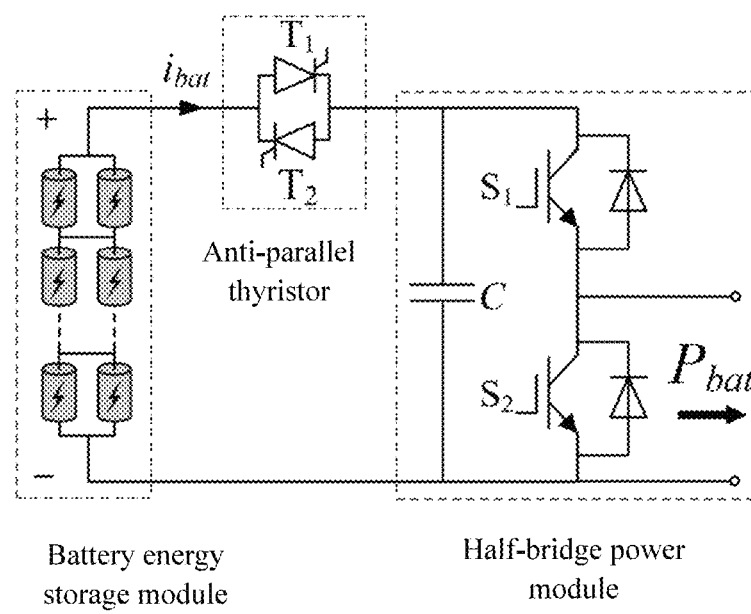
FIG. 4 illustrates a topology for an energy storage MMC sub-module according to an embodiment of the disclosure.

The disclosed energy storage MMC topology is different from the conventional topology in the energy storage sub-modules. The disclosed energy storage sub-modules each include a half-bridge module, a battery energy storage module and an interface unit therebetween, as shown in FIG. 4. The half-bridge module is composed of two switching power devices $S_1$ and $S_2$ with a reverse diode, and one capacitor C. In the battery energy storage module, a battery cluster is included, and a battery management system is also provided. The interface unit includes a group of anti-parallel thyristors $T_1$ and $T_2$. The group of anti-parallel thyristors are connected in series over the DC cable between the battery energy storage module and the capacitor of the half-bridge module. The anode of the first thyristor $T_1$ is connected to the positive electrode of the battery energy storage module, and the cathode of the second thyristor $T_2$ is connected to the positive electrode of the battery energy storage module.

Compared with the conventional energy storage MMC topology, the disclosure adds a group of anti-parallel thyristors between the battery energy storage module and the half-bridge module in each sub-module, which can avoid the microcirculation problem of the energy storage MMC battery and prolong the service life of the battery.

In combination with the energy storage MMC topology as disclosed, a corresponding control method is designed, including switching control of a sub-module battery and power control.

Figure 5:
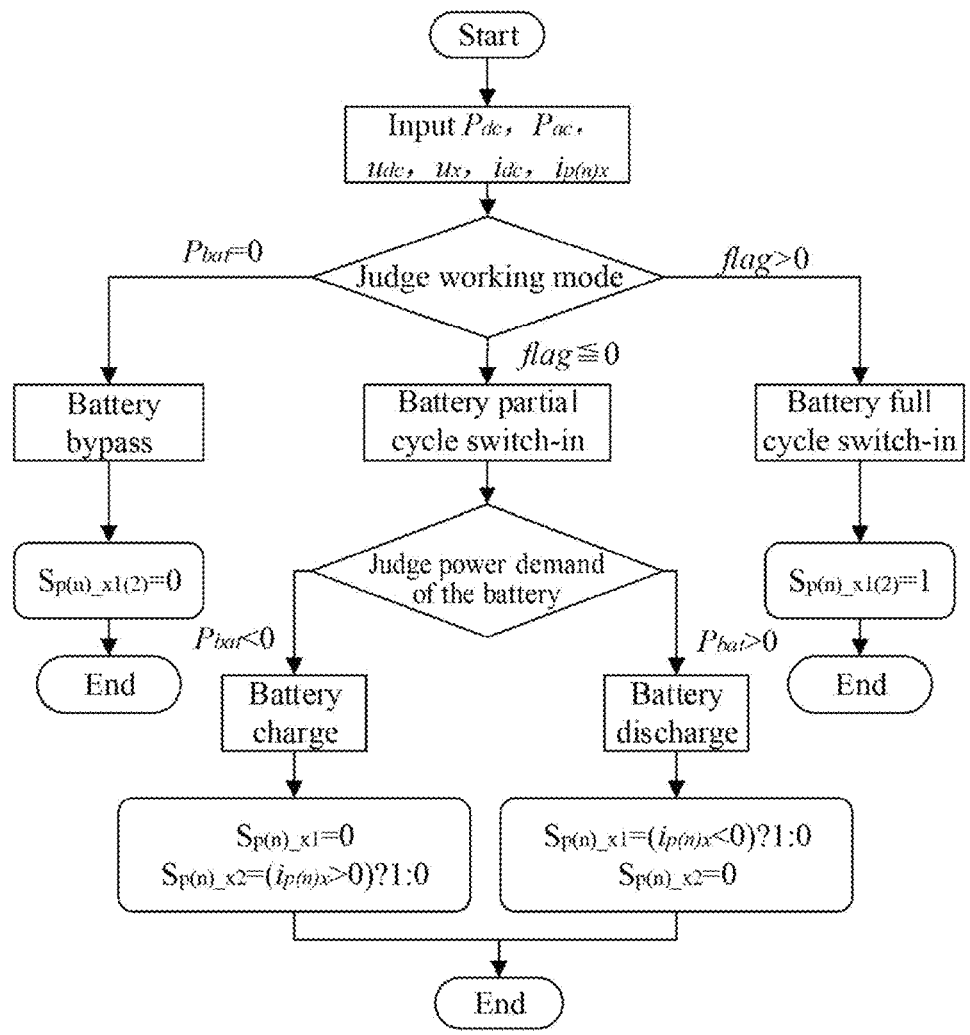
FIG. 5 illustrates a flowchart of switching control of a battery in an embodiment of the disclosure.

A flowchart of the switching control of the battery is shown in FIG. 5, and detailed control steps are described as follows.

At Step 1, when the energy storage MMC is initiated, trigger signals $S_{p(n)\_x1}$ and $S_{p(n)\_x2}$ of the anti-parallel thyristors are both maintained at 1 until the energy storage MMC operates stably.

At Step 2, when the system enters the stable operation stage, the operating mode of the energy storage MMC is judged according to operating parameters, which is specifically indicated as follows.

1) If the AC power is equal to the DC power (in consideration of errors of the system, the judgment threshold is set to be $|P_{ac}-P_{dc}|<0.5\%|P_{ac}|$), power of the energy storage battery $P_{bat}$ is set 0, where it is determined that the energy storage MMC shall operate in a battery bypass mode. At this time, the trigger signals $S_{p(n)\_x1}$ and $S_{p(n)\_x2}$ of the anti-parallel thyristors are both set to 0, so that the battery is bypassed.

2) If the AC power is not equal to the DC power, an operating flag value flag is calculated according to the following formula (2):

$$\text{flag} = |P_{dc}| - \frac{U_{dc}}{U_m}|P_{ac}| \quad (2)$$

where $P_{dc}$ is the power of the systematic DC side, U dc being the DC bus voltage, $U_m$ being the AC bus voltage amplitude, and $P_{ac}$ being the power of the systematic AC side.

3) If the flag>0, it is determined that the battery of the energy storage MMC shall be in a full cycle switch-in mode, in which the trigger signals $S_{p(n)\_x1}$ and $S_{p(n)\_x2}$ of the anti-parallel thyristors are both set to one.

4) If the flag≤0, it is determined that the battery of the energy storage MMC shall be in a partial switch-in mode, in which the trigger signals of the anti-parallel thyristors are judged and set according to the following substeps.

4.1) Power demand of the energy storage battery is calculated according to the following formula (1):

$$P_{bat} = P_{ac} - P_{dc} \quad (1)$$

where $P_{bat}$ is the power of the energy storage battery, $P_{ac}$ being the power of the systematic AC side, and $P_{dc}$ being the power of the systematic DC side.

4.2) If the $P_{bat}$<0, it is determined that the battery is in a charging state, in which discharge current shall be prevented from flowing into the battery during charging. In this state, the trigger signal $S_{p(n)\_x1}$ of the first thyristor $T_1$ is set as 0, and the trigger signal of the second thyristor $T_2$ is determined depending on bridge arm current at present, where if $i_{p(n)x}$>0, $S_{p(n)\_x2}$=1, and if $i_{p(n)x}$≤0, $S_{p(n)\_x2}$=0.

4.3) If the $P_{bat}$>0, it is determined that the battery is in a discharge state, in which charging current shall be prevented from flowing into the battery during discharge. In this state, the trigger signal $S_{p(n)\_x2}$ of the second thyristor $T_2$ is set as 0, and the trigger of the first thyristor $T_1$ is determined depending on the bridge arm current at present, where if $i_{p(n)x}$<0, $S_{p(n)\_x2}$=1, and if $i_{p(n)x}$≥0, $S_{p(n)\_x1}$=0.

Figure 6:
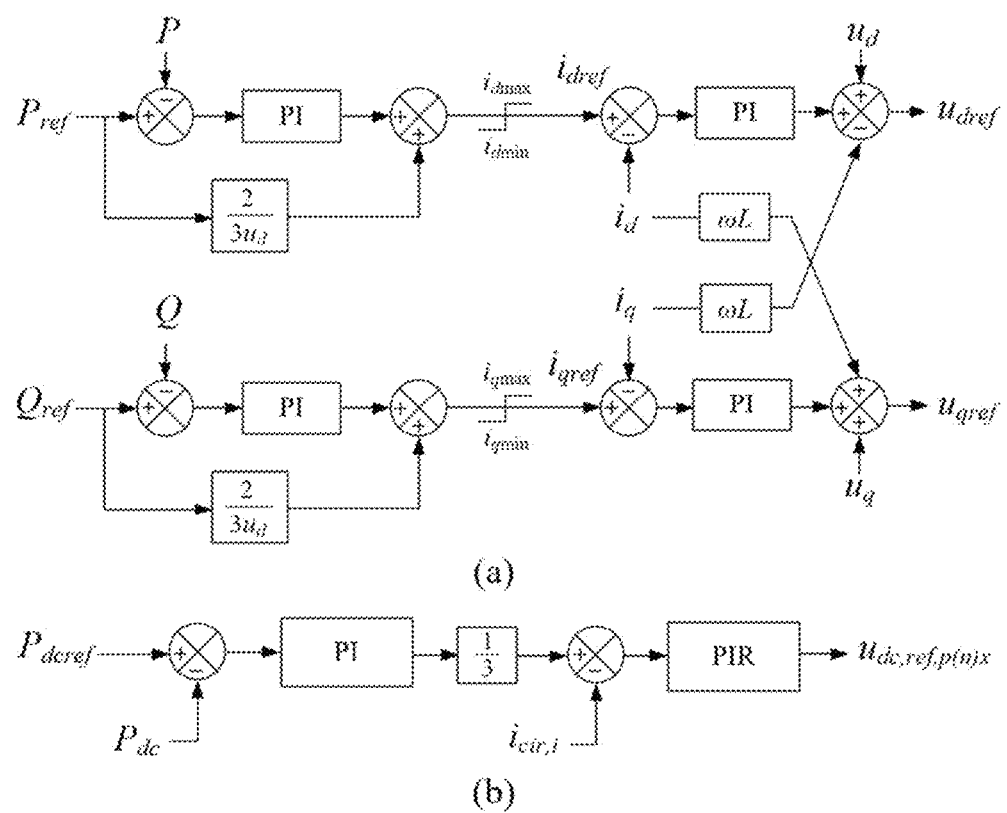
FIG. 6 illustrates block diagrams of (a) AC power control and (b) DC power control in an embodiment of the disclosure.

In order to ensure operational stability of the disclosed topology, the disclosure further designs a system power control strategy to ensure stable exchange of the power at three ports, namely the systematic AC side, the systematic DC side and the battery energy storage module. As shown in FIG. 6, the power control of the system includes (a) AC power control and (b) DC power control. The AC power control adopts a conventional double closed loop structure, which can realize decoupling d-axis current and q-axis current in a synchronous rotating coordinate system, and controlling active power and reactive power respectively. The DC power control adopts a phase-separated independent control method, in which an outer loop is a DC power loop, and an inner loop is a circulating current suppression loop. The DC power loop is subjected to proportional integral control to output a DC current tracking value of each bridge arm. The circulating current control loop is subjected to quasi-proportional resonance integral control. The transfer function is expressed as formula (3). The resonant frequency $\omega_1$ a second fundamental frequency, which aims to suppress the second circulating current inside the bridge arm and reduce the loss of the system.

$$G_{PR}(s) = k_p + \frac{k_i}{s} + \frac{2k_r\omega_c s}{s^2 + 2\omega_c s + \omega_1^2} + \frac{2k_r\omega_c s}{s^2 + 2\omega_c s + \omega_2^2} \quad (3)$$

In the formula (3), $G_{PR}(s)$ is the transfer function of the circulating current control loop, $k_p$ being the gain coefficient of a proportional link, $k_i$ being the gain coefficient of an integral link, $k_r$ being the gain coefficient of a resonance link, $\omega_c$, being the cutoff frequency, and s being a complex variable in the transfer function.

When the circulating current control loop is designed, such a problem caused by the staggered switching of batteries of the upper and lower bridge arms that the system undergoes third harmonic is additionally considered. When the system has no zero-sequence current path, the triple harmonic will reduce the power quality and seriously affect the stability of the system. Therefore, in order to meet the demand of directly connecting the energy storage MMC to the power grid without a transformer, it is necessary to suppress the third harmonic caused by battery switching. The disclosure adds a resonance term, of which the resonance frequency $\omega_2$ is a triple fundamental frequency to the circulating current control loop, so as to suppress the third harmonic in the system.

Figure 7:
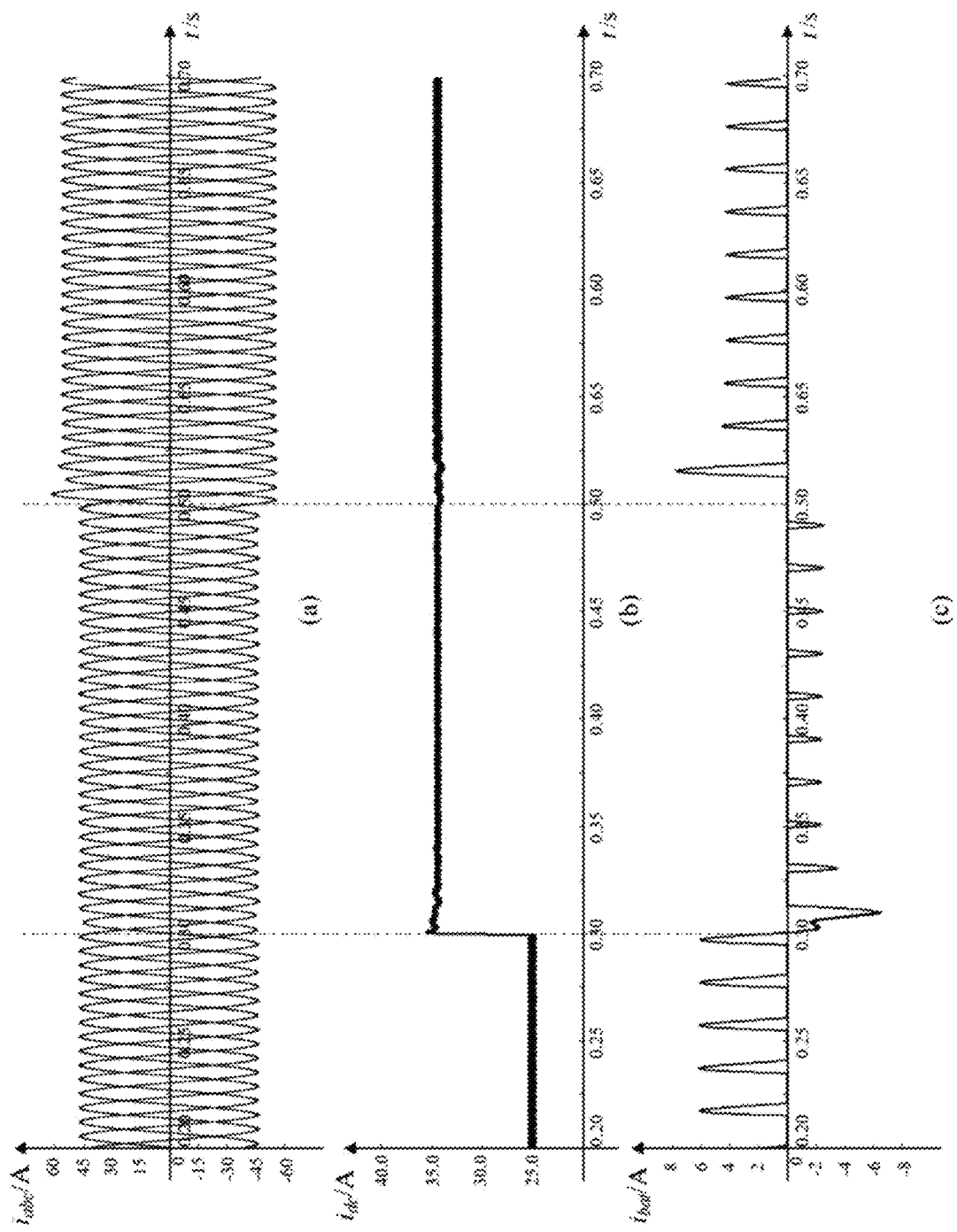
FIG. 7 illustrates steady-state operation waveforms for (a) AC three-phase current; (b) DC bus current; and (c) sub-module battery current of a system in an embodiment of the disclosure.

FIG. 7 provides waveforms of AC three-phase current, DC bus current and sub-module battery current of the energy storage system after adopting the topology and the control method provided by the disclosure. Within 0.2 s~0.3 s, $P_{dc}$=0.8 pu, and $P_{ac}$=1.0 pu. The battery is in a discharge state and there is only discharge current in the battery. The battery does not undergo microcirculation. The waveform of the AC current has good sinusoidal characteristics, and THD<1%. There are only high-frequency components in the DC bus harmonic. The system may operate stably.

At the moment of 0.3 s, it is given that $P_{dc}$=1.1 pu and $P_{ac}$=1 pu. The transient response of the system is fast. The battery is in a charging state and there is only charging current in the battery. The battery does not undergo microcirculation. The system undergoes third harmonic in a short time, which is completely suppressed after about 0.05 s. The system may operate stably.

At the moment of 0.5 s, it is given that $P_{dc}$=1.1 pu and $P_{ac}$=1.2 pu. The transient response of the system is fast. The battery is in a discharge state and there is only discharge current in the battery. The battery does not undergo microcirculation. The system undergoes third harmonic in a short time, which is completely suppressed after about 0.05 s. The system may operate stably.

Figure 8:
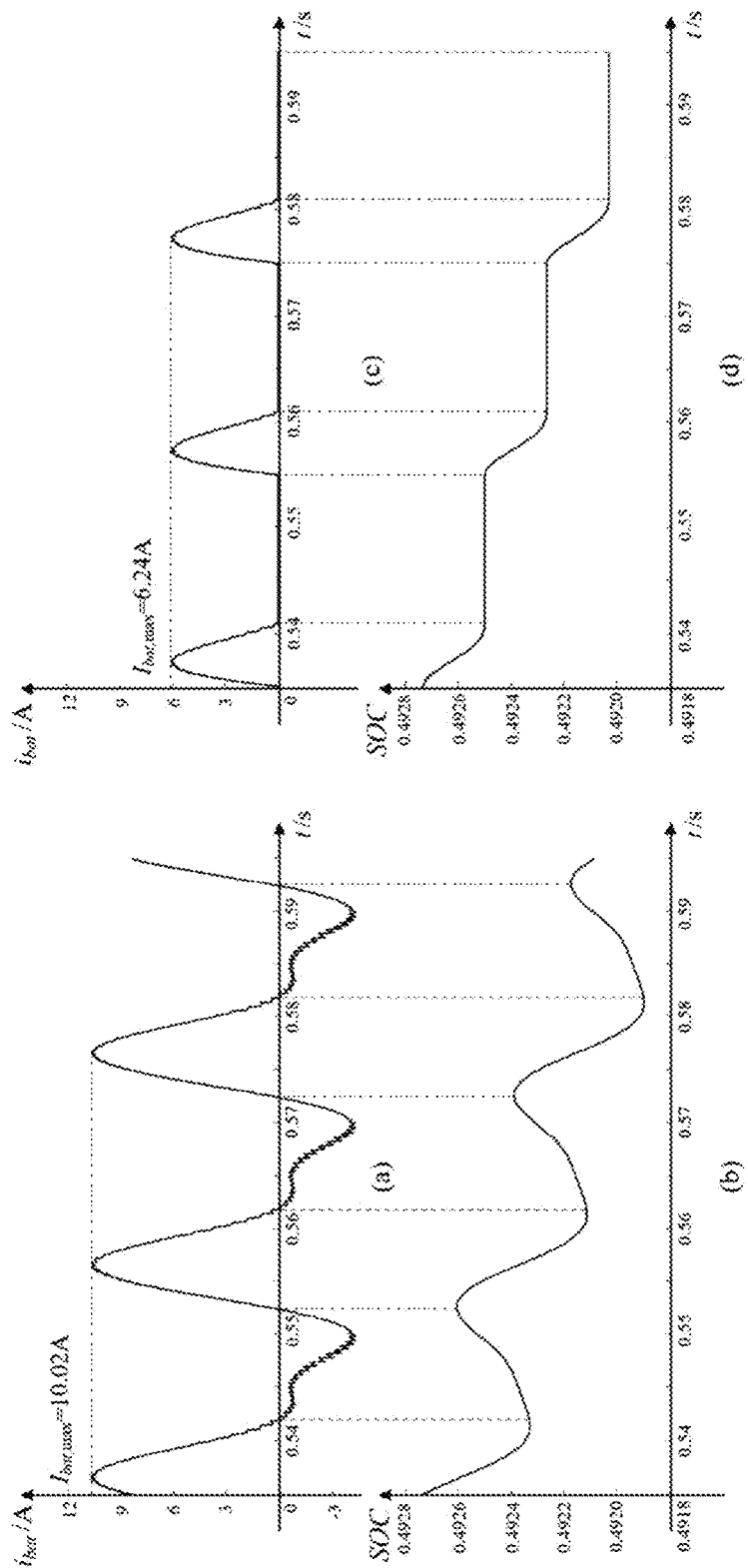
FIG. 8 illustrates comparison diagrams between (a) battery current and (b) battery SOC of the conventional topology and (c) battery current and (d) battery SOC of the topology according to an embodiment of the disclosure.

FIG. 8 compares battery current waveforms and battery SOC in the conventional topology and in the inventive topology when the system operates stably under an operating condition that $P_{dc}$=0.8 pu and $P_{ac}$=1 pu. Under this operating condition, an average power of the battery $P_{bat}$ is 0.2 pu (in a discharge state). When the conventional topology is used, there is still charging current in the battery current $i_{bat}$, and the battery undergoes microcirculation. The peak value of the battery discharge current is 10.02 A ($I_{bat,max}$=10.02 A). Upon the disclosed topology and control, there is only discharge current in the battery current $i_{bat}$, and the battery does not undergo microcirculation, which reduces consumption in the cycle life of the battery. At the same time, a peak value of the battery discharge current is 6.24 A ($I_{bat,max}$=6.24 A), which is 37.7% lower than that of the conventional topology, thereby reducing the loss of the battery.

$$PCT_{cyc} = \frac{\int_{t_0}^{t_0+T} |i_{cyc}| dt}{\int_{t_0}^{t_0+T} i_{need} dt} \times 100\% \qquad (4)$$

In the formula (4), $PCT_{cyc}$ is the proportion of cycle power in the external output power, $i_{cyc}$ being the microcirculation current of the battery, $i_{need}$ being the average current of the battery within the power frequency cycle, $t_0$ being the initial time of the calculation, and T being the power frequency cycle.

$$LOSS_{cyc} = W_{need} PCT_{cyc} \qquad (5)$$

In the formula (5), $LOSS_{cyc}$ is the power loss of the battery caused by microcirculation, and $W_{need}$ is external output energy of the battery.

The proportion $PCT_{cyc}$ of the microcirculation power in the external output power can be calculated according to the formula (4). The energy loss of the battery $LOSS_{cyc}$ caused by microcirculation can be calculated using the formula (5). Calculation is performed by taking such an operating condition as an example, and it can be obtained that $PCT_{cyc}=134.9\%$ under this operating condition. The rated capacity of the battery is set to be $W_{bat}$. With an assumption that the battery is charged without microcirculation loss, when the energy storage system maintains to discharge 100 $W_{bat}$ of electricity under this operating condition, it can be calculated that the use of the topology and the control method as disclosed can reduce the number of equivalent cycles of the battery by 139.4 cycles, thereby effectively reducing the life loss of the battery.

The disclosure provides an energy storage MMC topology avoiding microcirculation of battery and a method for controlling the same. The operating mode of the energy storage battery can be judged according to the operating parameters of the system, and then the battery can be switched as needed, thereby avoiding the microcirculation problem of the battery, reducing the life loss of the battery, and reducing the whole life cycle cost of the energy storage system. Moreover, the disclosure can reduce losses of the battery by reducing battery current significantly and further prolonging the service life of the battery. At the same time, the control method as provided by the disclosure can ensure the stable exchange of the power at three ports, namely the AC side, the DC side and the battery, thereby realizing the circulating current of the bridge arm and the harmonic suppression of the system, and ensuring the safe and stable operation of the system. In addition, compared with the prior art, the topology proposed by the disclosure has the advantages of simple implementation, a low cost and high reliability.

It shall be understood that the above-mentioned embodiments are only used to illustrate the disclosure, and are not intended to limit the scope of the disclosure. Any modifications, equivalent replacements, improvements, etc. made to the disclosure under the inspiration of the disclosure shall be within the protection scope of the disclosure.

The invention claimed is:

1. An energy storage MMC topology avoiding microcirculation of a battery, wherein the topology is composed of six bridge arms in three phases, each of which comprises two bridge arms, namely an upper bridge arm and a lower bridge arm, wherein a common point of the bridge arms in the three phases is configured as a DC port, and a midpoint between the upper and lower bridge arms is configured as an AC port, the DC port and the AC port being configured to be directly connected to a DC system and an AC system respectively; and wherein each of the bridge arms is composed of one bridge arm inductance and N energy storage sub-modules with the same structure in series, with N≥2, wherein the energy storage sub-modules each comprise a half-bridge power module, a battery energy storage module and an interface unit therebetween, and wherein the interface unit comprises a group of anti-parallel thyristors which are connected in series over a DC cable between the battery energy storage module and a capacitor of the half-bridge power module.

2. The energy storage MMC topology according to claim 1, wherein in the anti-parallel thyristors, an anode of a first thyristor $T_1$ is connected to a positive electrode of the battery energy storage module, and a cathode of a second thyristor $T_2$ is connected to the positive electrode of the battery energy storage module.

3. A method for controlling the energy storage MMC topology avoiding the microcirculation of the battery according to claim 1, wherein when the energy storage MMC operates normally, a systematic current operating mode is firstly judged according to operating parameters, and then switching control is performed on the battery energy storage module, wherein the method comprises the following steps:

1) setting, if the AC side power is equal to the DC side power in the energy storage MMC, power of the energy storage battery $P_{bat}$ as 0, where it is determined that the energy storage MMC is in a battery bypass mode, and trigger signals $S_{p(n)\_x1}$ and $S_{p(n)\_x2}$ of two anti-parallel thyristors in the interface unit are both set to 0, so that the battery energy storage module is bypassed;

2) calculating, if the AC side power is equal to the DC side power, an operating flag value flag according to formula (2):

$$\text{flag} = |P_{dc}| - \frac{U_{dc}}{U_m}|P_{ac}| \qquad (2)$$

where $P_{dc}$ is the power of the DC side, $U_{dc}$ being the DC bus voltage, $U_m$ being the AC bus voltage amplitude, and $P_{ac}$ being the power of the AC side;

3) determining, if the flag>0, that the battery of the energy storage MMC shall be in a full cycle switch-in mode, where the trigger signals $S_{p(n)\_x1}$ and $S_{p(n)\_x2}$ of the anti-parallel thyristors are both set to 1; and 4) determining, if the flag 0, that the battery of the energy storage MMC shall be in a partial cycle switch-in mode, where the trigger signals of the anti-parallel thyristors are judged and set according to the following substeps:

4.1) calculating power demand of the energy storage battery according to formula (1):

$$P_{bat} = P_{ac} - P_{dc} \qquad (1)$$

where $P_{bat}$ is the power of the energy storage battery, $P_{ac}$ being the power of the systematic AC side, and $P_{dc}$ being the power of the systematic DC side;

4.2) determining, if the $P_{bat}<0$, that the battery is charging, in which discharge current shall be prevented from flowing into the battery during charging, and in which the trigger signal $S_{p(n)\_x1}$ of the first thyristor $T_1$ is set as 0, and the trigger signal of the second thyristor $T_2$ is determined depending on bridge arm current at present, where if $i_{p(n)x}>0$, $S_{p(n)\_x2}=1$, and if $i_{p(n)x}\leq 0$, $S_{p(n)\_x2}=0$; and 4.3) determining, if the $P_{bat}>0$, that the battery is discharging, in which charging current shall be prevented from flowing into the battery during discharge, and in which the trigger signal $S_{p(n)\_x2}$ of the second thyristor $T_2$ is set as 0, and the trigger signal of the first thyristor $T_1$ is determined depending on the bridge arm current at present, where if $i_{p(n)x}<0$, $S_{p(n)\_x2}=1$, and if $i_{p(n)x}\geq 0$, $S_{p(n)\_x1}=0$.

4. The method according to claim 3, wherein the method further comprises decoupling control of the AC/DC power to ensure stable exchange of the power at three ports, namely the systematic AC side, the systematic DC side and the battery energy storage module; wherein the control AC side power adopts a conventional double closed-loop structure, which can realize decoupling d-axis current and q-axis current in a synchronous rotating coordinate system, and controlling active power and reactive power respectively; wherein the control of the DC side power adopts a phase-separated independent control method, in which an outer loop is a DC power loop, and an inner loop is a circulating current suppression loop; wherein the DC power loop is subjected to proportional integral control to output a DC current tracking value of each bridge arm; and wherein the circulating current suppression loop is subjected to quasi-proportional resonance integral control to suppress second circulating current and third harmonic suppression.

* * * * *